Patented Apr. 26, 1927.

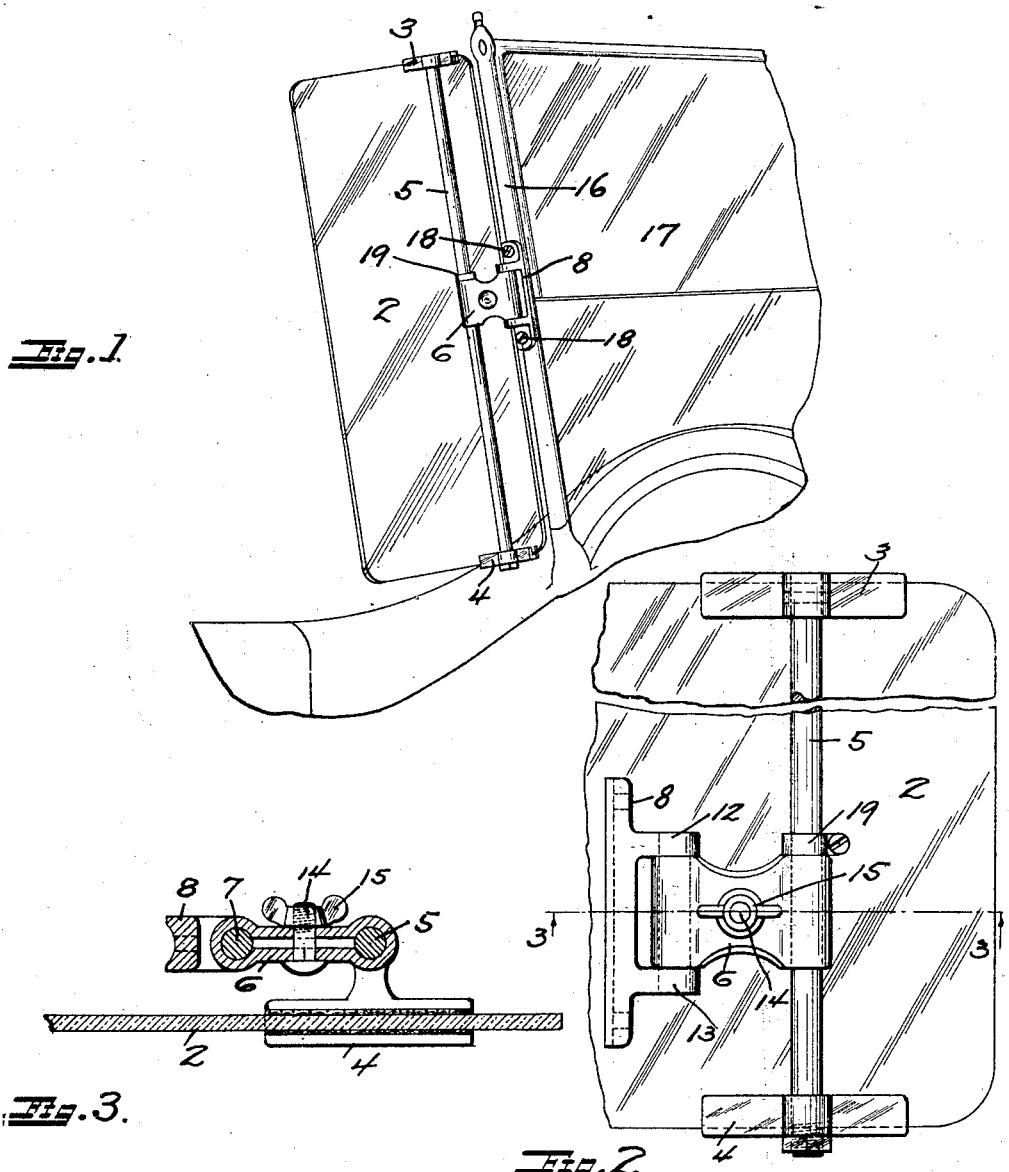

1,625,875

UNITED STATES PATENT OFFICE.

ALBERT WASSEL, OF SAN FRANCISCO, CALIFORNIA, ASSIGNOR, BY DIRECT AND MESNE ASSIGNMENTS, TO GEORGE J. HENRY, OF SAN FRANCISCO, CALIFORNIA.

VEHICLE WIND WING.

Application filed March 17, 1919. Serial No. 283,003.

The invention relates to wind-shield wings or attachments which extend outward from the sides of automobile wind-shields to increase the protection offered to the occupants of the automobile.

An object of the invention is to provide an adjustable wind-shield wing, of simple construction and easy and reliable operation and one that in its several adjusted positions presents symmetrical and harmonious appearance with the automobile and windshield parts.

Another object of the invention is to provide a wind-shield wing which may be attached to any wind-shield standard.

A further object of the invention is to provide a wind-shield wing which may be folded into position to permit the placing of the ordinary side or storm curtains on the automobile.

The invention possesses other advantageous features, some of which, with the foregoing, will be set forth at length in the following description where I shall outline in full, that form of the invention which I have selected for illustration in the drawings accompanying and forming part of the present specification. In said drawings I have shown one specific form of my generic invention, but it is to be understood that I do not limit myself to such form, since the invention, as expressed in the claims, may be embodied in a plurality of forms.

Referring to said drawings:

Figure 1 is a perspective view of a portion of an automobile wind-shield showing the wing of my invention attached thereto, the other portions of the automobile being well known although not shown.

Figure 2 is a fragmentary elevation of the wind-shield wing of my invention, part thereof being broken away to reduce the size of the figure.

Figure 3 is a cross section taken on the line 3—3, Figure 2.

The wind-shield wings of my invention are disposed adjacent the sides of the automobile wind-shield, forming lateral extensions thereof, which increase the protection to the occupants of the automobile. The wings are usually arranged to slope backward from the plane of the wind-shield, so that they deflect the wind outwardly, without causing too great an additional air resisting surface, but their position with respect to the plane of the wind-shield is optional with the driver. The wing of my invention may be readily adjusted to any desired angle and may be folded out of the way of the curtains when desired either by pushing or pulling the wing by one hand with sufficient pressure to overcome the frictional resistance of the hinge joint or by loosening the screw means 14, 15 and adjusting the wing as desired and re-clamping the parts.

The wing of my invention consists of a plate 2 of glass or other transparent material, preferably of substantially the same length as the height of the wind-shield, and of any desired width. The upper and lower edges of the plate 2 are engaged by brackets 3 and 4 connected together by the rod 5, forming a rigid structure. The rod 5 is spaced from the plate and is disposed intermediate the side edges of the plate. Engaging the rod 5 is a clamp 6 which also engages a rod 7 secured to the bracket 8 and disposed between the ears 12 and 13. A bolt 14 extends through the clamp 6 and is provided with a suitable nut 15 whereby the clamp may be tightened or loosened on the rods 5 and 7. The bracket 8 is attachable to the standard 16 of the wind-shield 17 by suitable means, such as screws 18.

The bracket 8 is adjustable longitudinally of the rod 5, so that its position with respect to the upper and lower edges of the plate 2 may be varied. Wind-shield standards are constructed in a variety of forms and the bracket 8 must be attached at different points to different standards, and by making the position of the bracket 8 adjustable with respect to the plate, the bracket may be positioned to engage the standard at the desired place. To prevent the rod 5 from sliding downward through the clamp 6 when it is loosened, a collar 19 is secured to the rod 5 directly above the clamp. The collar may be loosened and moved with the clamp in the initial setting of the wing, after which it is clamped in position.

The rod 5 will ordinarily be disposed parallel with the wind-shield standard and the rod 7 is preferably parallel to the rod 5. By overcoming the frictional resistance or by loosening the clamp, the angular position of the plate with respect to the standard may be adjusted and the plate may be swung bodily into different positions with respect to the standard.

The clamp in the specific type here shown acts as a link to permit bodily displacement of the rod 5 with respect to pintle 7 and the standard 16.

It will be noted that when the clamp is loosened to adjust or reset the wing that the entire operation may be done with one hand by the driver, and this is primarily because of the hinge axis being substantially parallel to the windshield standard. After the parts are moved into their new positions a single one hand movement will rigidly clamp the parts as desired.

The clamp which I prefer is one employing a friction between the hinge members so that in practice, it is not ordinarily necessary to unclamp and reclamp the parts when making an adjustment, but merely by one hand to overcome the frictional resistance of the clamp and force the wing to swing on its hinge against the said frictional resistance and into the new position, the said frictional resistance being sufficient to overcome the wind pressures of operation.

It will also be seen that where the axis of adjustment is substantially parallel with the plane of the wing, the wings will always present a symmetrical and harmonious appearance with the windshield, in any and all of the adjusted positions.

In the specific form of my invention above set forth, I have shown two pintles providing two axes of movement about which the wing or plate 2 may move with respect to the standard 16; that is either about the axis of the pintle 5 or the pintle 7.

According as the adjusting means 14, 15 is more or less tightly clamped there is introduced a greater or less frictional gripping against the pintle means and against such movement and therefore a retention of the wing in any adjusted position when the hand is released.

The movement of the wing about either or both of the pintles or rods 5 or 7 will be at right angles to the plane of the glass plate and about the axis of movement passing through either or both rods and because of the movement of the wing being so restrained it will at all times present a substantially parallel appearance or an appearance at a fixed predetermined angle to the windshield standard or edges as distinguished from wings employing universal joints or hinges having other movements or adjustments.

In the wing structure here shown the tightening of the screw parts 14, 15 cause the co-acting surfaces, in this case the pintles 5 and 7 to be gripped and member 6 together in frictional relation and this friction may be varied by varying the pressure between the co-acting surfaces as determined by the wing nut 14. Other forms of hinge joint and other forms of co-acting friction surfaces and clamping means may be employed without departing from my invention.

The employment of the specific double pintle form here shown enables a lateral displacement of the entire wing. Thus if storm curtains are to be used the entire wing and clamp are swung inward about pintle 7 thus affording ample clearance and when the curtains are removed the structure is swung outward about pintle 7 and may also be adjusted at any horizontal angle about pintle 5. Other forms of bracket and of hinge members with single pintles or a plurality of pintles or of clamps may, however, be employed without departing from my invention, and I wish to be understood as claiming broadly, my glass plate wing, in combination with other forms of brackets and hinges and clamps, whereby the plate is frictionally held in any adjusted position about and in respect to a windshield standard, or where a glass plate wing is pivotally mounted on an axis of movement substantially parallel with the said standard or the said plate and is provided with clamping means to frictionally hold the plate against displacement.

Reference is herein made to my co-pending application, Serial No. 692,742, filed February 14, 1924.

I claim:

1. A wind shield wing comprising a transparent plate and a rod extending lengthwise of said plate, and secured on its ends with said plate, a bracket constructed and adapted to be secured to a standard and having a cylindrical member, a link embracing said cylindrical member and said rod and clamping means whereby the link is caused to seize the rod and the cylindrical member.

2. A wind shield wing comprising a plate of transparent material in combination with a supporting rod fixed longitudinally with said plate, a bracket and a cylindrical member fixed to said bracket, a split link through which the rod passes on one end and the cylindrical member on the other end, and a screw clamp adapted to compress the link against the said rod and the said member.

3. An attachment for a wind shield having a standard, a transparent plate fixed on its ends from a cylindrical rod, a bracket comprising a cylindrical standard substantially parallel with said rod, and a two part link engaging between its parts the said rod and said standard, and provided with clamp means between said link parts to securely clamp the link, the rod and the standard.

4. In an auxiliary wind shield, a transparent plate having a fixture disposed substantially at each end thereof, a rod rigid with said fixtures and having a cylindrical part serving as a hinge, a bracket having a cylindrical member serving as a hinge, and a compressible link having a hole at each end, one of the holes adapted to embrace the cylindrical part of the rod and the other hole to embrace the cylindrical member, and clamp means adapted to compress the link and clamp the rod and member.

5. An auxiliary wind shield comprising a member adapted to rigidly engage the side bar of an automobile wind shield and having a permanently rigid hinge pin, an auxiliary wind shield body having a hinge bar, and a clamping member adapted to rigidly clamp the hinge pin and to rigidly clamp the hinge bar so as to hold the auxiliary wind shield body in an adjusted position relative to the main wind shield.

6. In a wind shield, a shield member, supporting means for the shield member embodying a bar substantially parallel to and across and spaced from the face of the shield member and a double ended clamp adapted at one end to clamp the bar to support it adjustably both longitudinally and rotatively and adapted at the other end to adjustably clamp a stationary element for its own support.

In testimony whereof, I have hereunto set my hand at San Francisco, California, this 10th day of March, 1919.

ALBERT WASSEL.